No. 877,815. PATENTED JAN. 28, 1908.
T. J. WESTERMAN.
GEARING.
APPLICATION FILED APR. 26, 1907.
2 SHEETS—SHEET 2.
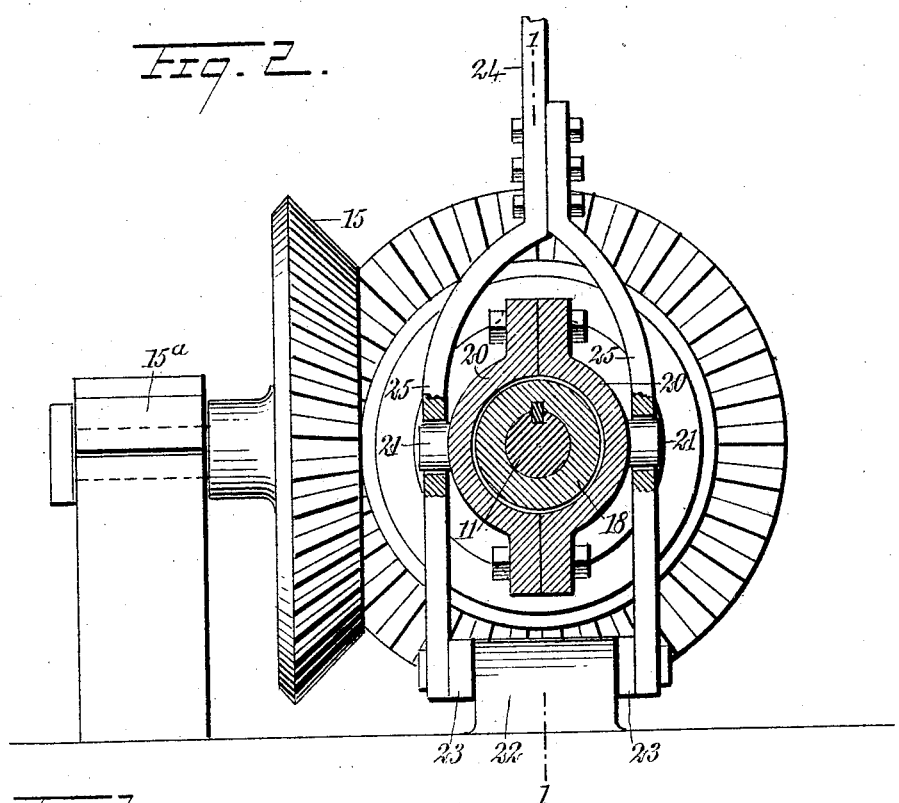
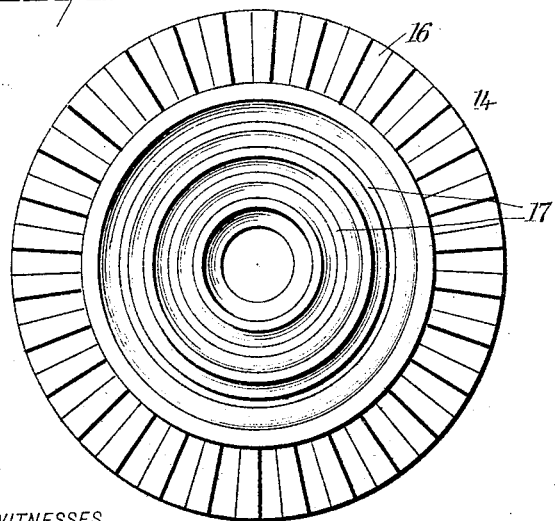
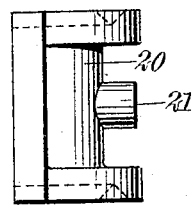
WITNESSES
INVENTOR
Thomas James Westerman
BY
ATTORNEYS

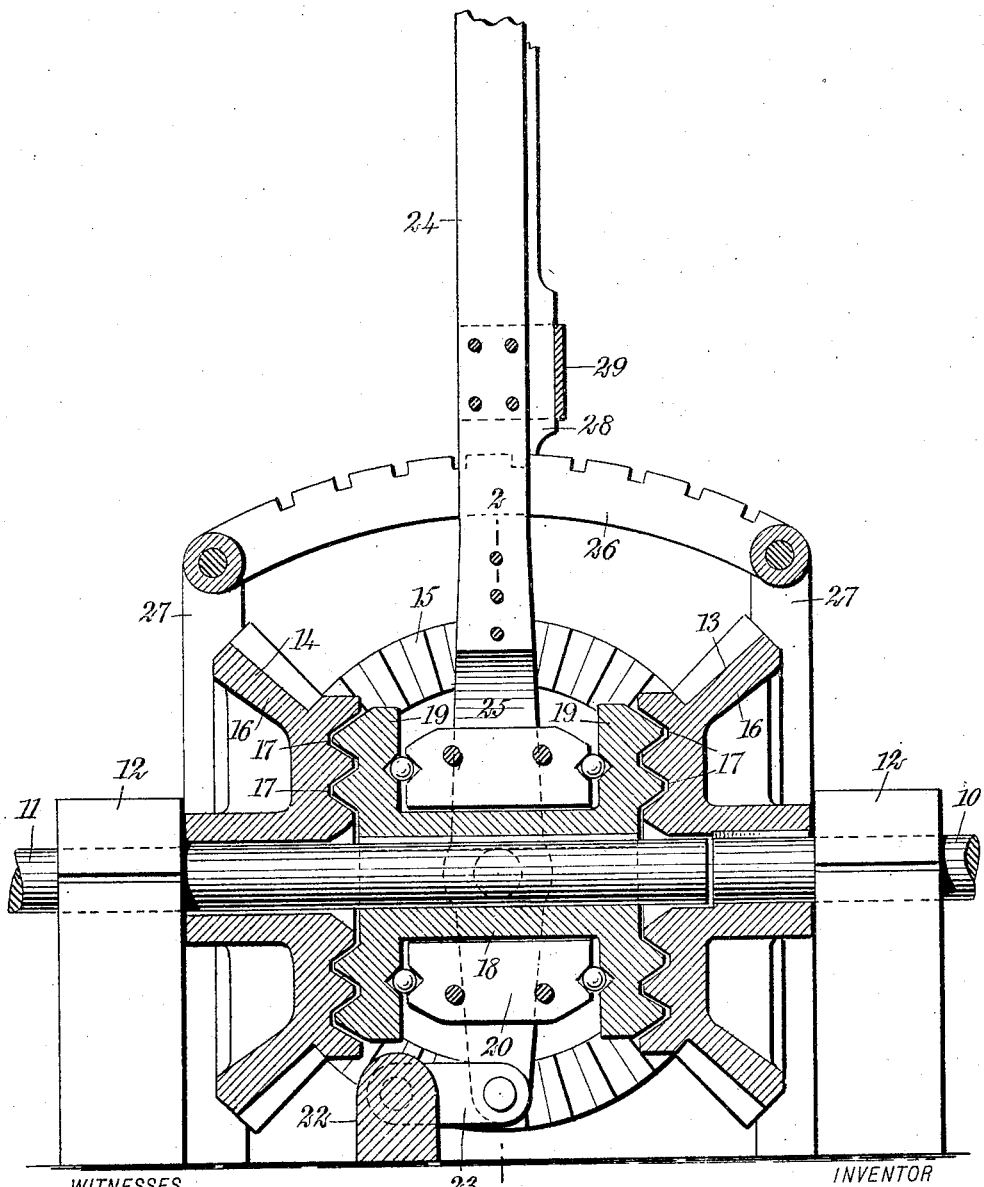

UNITED STATES PATENT OFFICE.

THOMAS JAMES WESTERMAN, OF OLALLA, WASHINGTON.

GEARING.

No. 877,815.  Specification of Letters Patent.  Patented Jan. 28, 1908.

Application filed April 26, 1907. Serial No. 370,483.

*To all whom it may concern:*

Be it known that I, THOMAS JAMES WESTERMAN, a citizen of the United States, and a resident of Olalla, in the county of Kitsap and State of Washington, have invented a new and Improved Gearing, of which the following is a full, clear, and exact description.

This invention relates to certain improvements in reversible friction clutches, and more particularly to means whereby the area of the friction faces may be materially increased to more effectively hold the parts in engagement with each other; the object of the invention being to provide the maximum gripping power for the minimum area of friction surface, and to provide a device simple in construction and positive in its operation.

The invention consists in certain features of construction and combination of parts, all of which will be fully set forth hereinafter and particularly pointed out in the claims.

Reference is to be had to the accompanying drawings, forming a part of this specification, in which similar characters of reference indicate corresponding parts in all the figures, and in which Figure 1 is a sectional side elevation, said section being taken on the line 1—1 of Fig. 2; Fig. 2 is a vertical section taken in a plane at right angles to the plane of Fig. 1, and on the line 2—2 of Fig. 1; Fig. 3 is a face view of one of the corrugated faced gear wheels; and Fig. 4 is a side elevation of one-half of the reversing sleeve.

In the specific form of the clutch illustrated in the accompanying drawings, I provide two shafts supported in alinement with each other, one of said shafts serving as the drive shaft and the other as the driven shaft. It is immaterial which of these shafts is used as the drive shaft, but for clearness in description I will hereinafter refer to the shaft 10 as the drive shaft and the shaft 11 as the driven shaft. The two shafts are mounted in suitable bearings 12, and the adjacent ends of the two shafts are preferably spaced a very short distance apart, whereby they do not frictionally engage with each other. Each of the shafts support a gear wheel and both of these gears 13 and 14 intermesh with an idler gear wheel 15 mounted to rotate in a plane at right angles to the plane of the first mentioned gear wheels. The gear 13 is keyed or otherwise rigidly secured to the shaft 10, while the gear 14 is freely rotatable in respect to its shaft 11. The idler 15 is mounted in any suitable manner, as, for instance, upon a stub shaft supported in a suitable journal 15$^a$. The two gear wheels 13 and 14 are similar in construction, and each comprises a beveled portion 16 which engages with the beveled portion of the idler 15. These beveled engaging portions may, if desired, be provided with gear teeth or may be roughened and engage merely by frictional contact.

The face of each gear wheel is provided with a plurality of concentric grooves 17, preferably triangular in cross section and lying in a plane at right angles to the axis of rotation of the shafts. Either the drive shaft or the driven shaft, preferably the latter, extends across from one gear wheel to the opposite gear wheel, and upon this section of the shaft there is provided a longitudinally movable collar 18 keyed to the shaft, so as to prevent its rotation in respect thereto. At each end of the collar there are provided annular flanges 19 lying substantially parallel to the faces of the gear wheels and each provided with concentric corrugations corresponding in size and position to the corrugations or grooves of the faces of the gear wheels. The collar 18 is as above stated, longitudinally movable, and by said movement either of the flanges 19 and its corrugations may be brought into engagement with the face and corrugations of the adjacent gear wheel to cause the collar and said gear wheel to frictional engage and simultaneously rotate.

Surrounding the body of the collar 18 and intermediate the two flanges 19, 19, there is provided a sleeve 20 made up of two sections bolted or otherwise rigidly secured together and having outwardly extending trunnions 21 upon opposite sides thereof. The ends of this sleeve are provided with ball races oppositely disposed to corresponding ball races in the adjacent faces of the flanges 19, whereby the collar 18 may freely rotate in engagement with the sleeve 20 with as little friction as possible. The bearing of the sleeve 20 is slightly larger than the outer circumference of the intermediate portion of the collar 18, and by means of the trunnions 21 the sleeve is supported, so that it engages with the collar only through the medium of the ball bearings adjacent the ends of the sleeve. For moving the sleeve longitudinally, there is provided a suitable supporting lug 22 having links 23 pivotally connected thereto and serving as connections for a suitable operating lever 24. This lever is provided with yoke arms 25 at its lower end, said yoke arms extending upon opposite sides of the sleeve 20 and engaging with the trunnions 21 and the ends of the links 23. By moving the lever 24, the collar 18 may be forced into engagement with either of the gear wheels 13 and 14, and by reason of the corrugated faces upon said gear wheels and said collar, the maximum area of frictional surface is secured. The gripping power is increased not only by the increased area, but also by the wedging action of the tapered ridges of one face into the tapered grooves of the adjacent face. As the gear wheel 13 is keyed to its shaft and the gear wheel 14 is freely rotatable in respect to its supporting shaft, and the collar 18 is longitudinally movable but non-rotatable in respect to the shaft 11, it is evident that by forcing the collar into engagement with the gear wheel 13, the shafts 10 and 11 are caused to rotate simultaneously in the same direction; but by forcing the collar 18 into engagement with the gear wheel 14, the power is transmitted from the drive shaft 10 through the gear wheel 13, idler 15 and gear wheel 14 to the collar, which in turn transmits it to the shaft 11 and causes the latter to rotate in the reverse direction from the shaft 10.

For firmly holding the collar in engagement with either of the gear wheels, there is preferably provided a segment 26 supported upon suitable standards 27 and adapted to be engaged by a longitudinally movable dog 28 carried by the handle and sliding within a guide 29. Two of these segments may, if desired, be provided, and lying upon opposite sides of the handle 24 serve as guides for the same.

In the improved device above described, it is entirely immaterial whether the wheels 13, 14 and 15 be provided with intermeshing teeth or whether they be provided with frictionally engaging surfaces, as these gears are not thrown into or out of mesh in the operation of the device, but are held in a fixed relation to each other at all times. My improved clutch may be reversed without any danger of breaking the gear teeth, for if such teeth are employed they remain constantly in mesh. The collar may be moved to a position out of engagement with either gear wheel and the device permitted to remain at rest, or by only lightly holding it in engagement with either wheel and permitting a small amount of slipping, the driven shaft may be rotated at a slower speed than the drive shaft. The sleeve 20 being longitudinally immovable in respect to the collar 18 and having sets of ball bearings at each end thereof, it is evident there is no lost motion and that the collar 18 rotates with the minimum friction.

Having thus described my invention, I claim as new and desire to secure by Letters Patent:

1. The combination of two bevel wheels, means for connecting said bevel wheels whereby they rotate simultaneously in opposite directions, a driven shaft concentric with said wheels, a collar non-rotatably mounted upon said shaft and longitudinally movable in respect thereto to engage with either of said wheels to cause the rotation of said driven shaft in either direction, the engaging surfaces of said wheels and said collar being provided with concentric corrugations, a sleeve surrounding said collar and ball bearings spacing said collar and sleeve.

2. The combination of a drive shaft, a bevel gear wheel secured thereto, a driven shaft in alinement with the drive shaft and terminating closely adjacent thereto, a second bevel gear wheel rotatably mounted upon the driven shaft, each of said bevel gear wheels having the adjacent faces thereof provided with concentric corrugations, a collar keyed to said driven shaft intermediate said bevel gear wheels and having flanges provided with concentric corrugations adapted to engage with the corrugations of either of said wheels, a non-rotatable sleeve surrounding said collar, end thrust ball bearings intermediate the ends of the sleeve and said collar, a lever for moving said sleeve longitudinally, and a bevel gear wheel meshing with both of the first mentioned bevel gear wheels.

3. The combination of two gear wheels, means for connecting said gear wheels whereby they rotate simultaneously in opposite directions, a driven shaft concentric with both of said wheels, a collar non-rotatably mounted upon said shaft and longitudinally movable in respect thereto to engage with either of said wheels to cause the rotation of said driven shaft in either direction, the engaging surfaces of said wheels and said collar being provided with concentric corrugations, a sleeve surrounding said collar and spaced therefrom and ball bearings at each end of the sleeve and intermediate the sleeve and collar to resist end thrust.

4. The combination of two wheels, means in operative engagement with said wheels whereby they rotate simultaneously in opposite directions, a driven shaft concentric with said wheels, a collar non-rotatably mounted upon said shaft and longitudinally movable in respect thereto, said collar having annular flanges surrounding each end thereof and adapted to engage with the surfaces of said wheels to cause the rotation of said driven shaft in either direction, a sleeve surrounding said collar, and bearings interposed between the ends of said sleeve and the flanges of said collar.

In testimony whereof I have signed my name to this specification in the presence of two subscribing witnesses.

THOMAS JAMES WESTERMAN.

Witnesses:
HENRY PFUNDT,
PHILIP H. GREEN.